3,231,621
REACTION RATES IN CATALYTIC
HYDROFORMYLATION
Lynn H. Slaugh, Pleasant Hill, Calif., assignor to Shell
Oil Company, New York, N.Y., a corporation of
Delaware
No Drawing. Filed June 26, 1961, Ser. No. 119,313
7 Claims. (Cl. 260—604)

The present invention relates to the preparation of oxygenated organic compounds, particularly aldehydes and alcohols, by the reaction of carbon monoxide and hydrogen with olefinic organic compounds in the presence of an improved hydroformylation catalyst. More specifically, the present invention relates to hydroformylation using certain metal complex catalysts having associated therewith certain ligands to be described in detail hereinafter.

Hydroformylation is well known in the art and comprises converting an olefin by reaction with carbon monoxide and hydrogen to a corresponding aldehyde or alcohol, the aldehyde or alcohol group being substituted on one of the carbon atoms previously involved in the olefinic linkage. Isomerization of the original double bond leads to several different olefins, in which case the hydroformylation product is varied accordingly. The olefinic linkage is simultaneously saturated with the addition of hydrogen and carbon monoxide to form the aldehyde or alcohol. Thus, hydroformylation may be shown in the general case by the following equation:

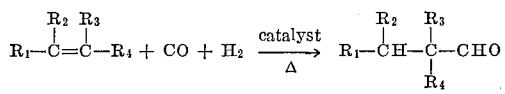

and/or

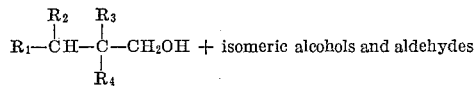

In the above equation, each R represents an organic radical or a suitable atom such as hydrogen or a halogen. The above reaction is similarly applicable to an olefinic linkage in a cycloaliphatic ring, as, for example, when $R_2$ and $R_3$ are joined into a divalent radical, such as tetramethylene, or the like.

In the past, dicobalt octacarbonyl has been widely used as a catalyst for the hydroformylation of olefins. This catalyst may be prepared from many forms of cobalt by reduction with hydrogen in the presence of carbon monoxide under pressure. However, this catalytic material suffers from several rather serious shortcomings. One disadvantage is a relatively low reaction rate. While dicobalt octacarbonyl is widely used industrially in Oxo processes, there still exists a real need for improvement in catalyst performance, particularly increased reaction rates.

The present invention now provides an improved hydroformylation process for compounds having olefinic linkage wherein the rates of reaction are significantly increased over those obtainable from known catalytic materials including, among others, dicobalt octacarbonyl. This increase in reaction rate of catalytic hydroformylation of carbon compounds containing olefinic linkage constitutes a primary object of this invention.

In brief, the invention comprises reacting carbon monoxide, hydrogen, and a carbon compound containing olefinic linkage with a hydroformylation catalyst comprising a complex between a metal, preferably cobalt, carbon monoxide, and a nitrogen-containing ligand comprising a substituted pyridine, to be described hereinafter, under conditions sufficient to produce aldehydes and alcohols containing one more carbon atom than present in the olefinic reactant.

As used herein, the term "complex" indicates a coordination compound which is a combination of a metal atom with one or more electronically-rich molecules or atoms capable of independent existence.

The metal is held in complex combination with the particular nitrogen-containing ligand found most desirable for the particular process wherein it is to be used. The ratio of the molar amount of ligand in the complex is determined by the coordination number of the particular transition metal involved. By "ligand" is meant a molecule having an element with a pair of electrons capable of bonding with a metal atom whereby a complex is formed. The carbon monoxide molecule is an example of such a ligand and may serve as at least a portion of the complexes suitable in the present invention. However, the catalyst must also contain a nitrogen-containing ligand comprising a substituted pyridine molecule, which will be described now in greater detail.

In order to fully realize the advantages of the present invention, the pyridine must be substituted by at least one non-hydrocarbon electro-negative substituent. Examples of appropriate substituents are middle halides such as chloride and bromide, cyanide, carboxylic acid, carboxylic ester, carboxylic acid anhydride, sulfonic acid and phosphoric acid. While more than one electro-negative substituent may be present in the substituted pyridine ligand with certain appreciable advantageous results, it has been found that for optimum effectiveness the use of but one such substituent in the pyridine molecule is preferred.

The substituted pyridine compounds which may be used as ligands in the metal complex catalysts are relatively well known organic materials themselves.

In the catalytic complexes useful herein, a carbon monoxide molecule can replace any nitrogen-containing ligand provided that at least one ligand molecule of substituted pyridine is present in each complex.

The catalysts for use in the process of this invention may be prepared by a diversity of methods. A convenient method is to combine a salt of the desired transition metal with the desired nitrogen-containing ligand in liquid phase. The valence state of the transition metal may then be reduced by hydrogenating the solution. The reduction may be performed prior to the use of the catalyst or it may be accomplished simultaneously with the hydroformylation process of this invention. Alternatively, the catalyst may be prepared from a carbon monoxide complex of the metal. For example, it is possible to start with dicobalt octacarbonyl, and by simply heating this substance with a suitable nitrogen-containing ligand of the type previously described, replace one or more of the carbon monoxide molecules by nitrogen-containing ligand, producing the desired catalyst. This latter method was utilized in the preparation of most of the catalysts used in the examples hereinafter described. This latter method is very convenient for regulating the number of carbon monoxide molecules and other types of ligand molecules present in the catalyst. Thus, by increasing the amount of ligand added to the dicobalt octacarbonyl, more of the carbon monoxide molecules may be replaced.

The hydroformylation reaction is carried out by intimately contacting a carbon compound containing olefinic linkage such as an aliphatic olefin hydrocarbon, generally in liquid phase, with carbon monoxide and hydrogen in the presence of the catalytic material at hydroformylation temperature and pressure and under conditions sufficient to produce the desired reaction product. The reaction may be carried out at pressures of from about 500 to 5000 p.s.i. of hydrogen and carbon monoxide, with from about 1000 to 3000 p.s.i. being preferred. If desired, even higher pressures, say about 6500 p.s.i., may often be advantageously used. The temperature may, in a large degree, depend upon the selected pressure as well as upon the desired reaction product. While it may ordinarily be in the range of from about 75° to 300° C., it has been found that a temperature of from about 120° to 150° C. is suitable and often preferred.

The process of this invention is generally applicable to the hydroformylation of any aliphatic (cyclic or acylic) compound having at least one ethylenic carbon-to-carbon bond. The invention is used to advantage in the hydroformylation of carbon-to-carbon ethylenically unsaturated linkages in hydrocarbons, preferably of from 2 to 12 carbons. Monoolefins such as ethylene, propylene, and butylene are a few examples of suitable lower alkenes; by lower is meant an alkene of 2 to about 8 carbon atoms. Feed hydrocarbons may include both branched- and straight-chain compounds having one or more of these ethylenic or olefinic sites. These sites may be conjugated, as in 1,3-butadiene, or non-conjugated, as in 1,5-hexadiene. In the case of polyolefins, i.e., polyenes, one or more of the olefinic sites may be hydroformylated. The unsaturated carbon-to-carbon linkages may be between terminal and their adjacent carbon atoms, as in 1-pentene, or between internal chain carbon atoms, as in 4-octene, or as in cyclohexene.

Macromolecular materials involving acyclic units of the above types such as polydiolefins like polybutadiene, as well as copolymers of olefins and diolefins such as styrene-butadiene copolymer, are also within the scope of applicability of this invention.

Hydrocarbon cyclic compounds are equally suitable for use in this invention, especially five- and six-ring carbon atom hydrocarbons. This group includes the unsaturated alicyclic hydrocarbons such as the cylic olefins containing carbon-to-carbon unsaturation such as the cyclo-alkenes like cyclopentene, cyclohexene, and cycloheptene. Also included in this category are the terpenes and fused-ring polycyclic olefins, such as 2,5-bicyclo(2.2.1)-heptadiene, 1,4,4a,5,8,8a-hexahydro-1,4,5,8 - dimethanonapth-thalene and the like.

The process of this invention may also be used to hydroformylate ethylenic carbon-to-carbon linkages of non-hydrocarbons. Thus, it is possible to hydroformylate olefinically unsaturated alcohols, aldehydes, and acids whereby the formyl or carbinol group is introduced into the molecule at a site of unsaturation. The following are a few specific examples of different types of olefinic compounds that may be hydroformylated in accordance with the invention and the products obtained thereby:

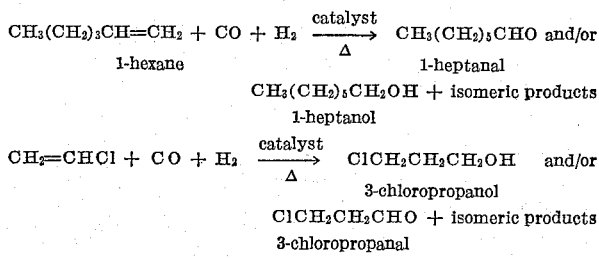

$$CH_3(CH_2)_3CH=CH_2 + CO + H_2 \xrightarrow[\Delta]{catalyst} CH_3(CH_2)_5CHO \text{ and/or}$$
1-hexane 1-heptanal $$CH_3(CH_2)_5CH_2OH + \text{isomeric products}$$
1-heptanol $$CH_2=CHCl + CO + H_2 \xrightarrow[\Delta]{catalyst} ClCH_2CH_2CH_2OH \text{ and/or}$$
3-chloropropanol $$ClCH_2CH_2CHO + \text{isomeric products}$$
3-chloropropanal

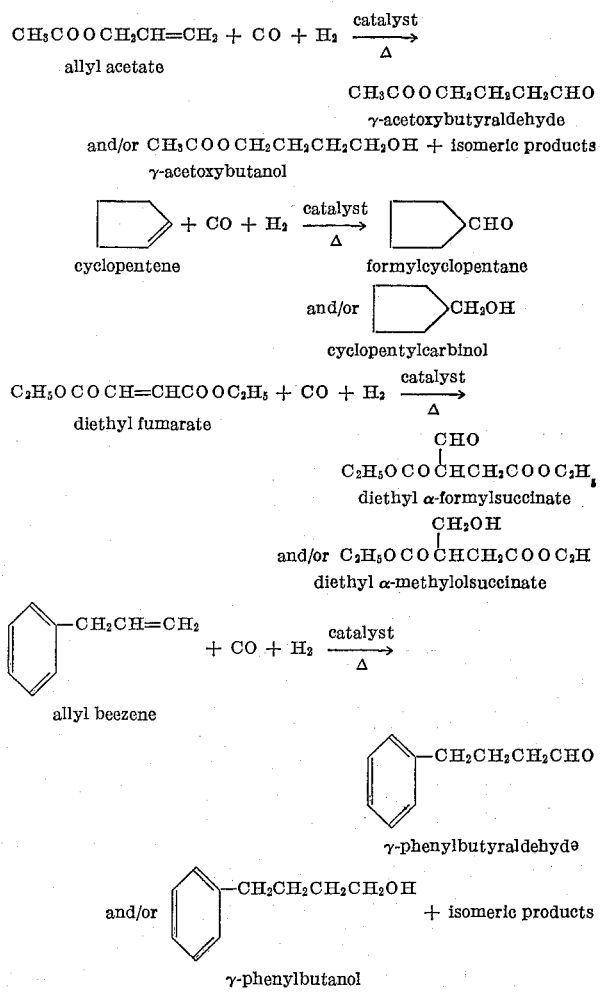

As will be seen from the general equation given for the hydroformylation reaction when producing alcohols, at lease one mole of carbon monoxide and two moles of hydrogen are required for each mole of olefin. If conditions are selected that will result primarily in an aldehyde product, only one mole of hydrogen is required for each mole of olefin. Highest yields, therefore, require at least these stoichiometric amounts of carbon monoxide and hydrogen reactants. Preferably, however, these reactants are present in an excess of the olefin.

The ratio of hydrogen to carbon monoxide at any given time may be varied according to the particular olefin undergoing hydroformylation. Generally, the ratio will be at least 1. It has been found that in many cases, the rate of reaction as well as the yield of desired product may be increased by increasing the $H_2/CO$ ratio to about 2, although higher ratios up to about 10 or more may be used.

Ratios of catalyst to the olefin to be hydroformylated are not particularly critical and may be varied in order to achieve a homogeneous solution. Solvents are therefore not required, although inert solvents such as suitable saturated hydrocarbons, ketones, alcohols, etc., may be used if desired. In general, larger quantities of catalyst will produce a faster reaction rate. Ratios of catalyst to olefin between 1:1000 and 1:1 will normally accomplish the desired effect.

When the reaction has preceeded to completion, the hydroformylation product may be removed from the reaction mixture by suitable means. Normally, distillation, filtration or extraction with a solvent will be employed, although other methods may be adapted when required.

The catalyst may then be recycled for further hydroformylation of additional olefin.

The following example will best explain the details and illustrate the advantageous results of the process of this invention. It is to be understood that the example is given only for illustration and is not to be construed as limiting scope or spirit of the invention except as delineated in the appended claims.

EXAMPLE 1-pentene (0.064 mole), n-octane (20 ml.), dicobalt octacarbonyl (0.001 mole) and a nitrogen-containing ligand (0.010 mole) were placed into an 80 ml. magnetimally stirred autoclave. After sealing the autoclave, it was flushed with an inert gas and then pressured with $H_2$ and CO. The autoclave was heated to the temperature specified in the accompanying Table. The resulting maximum pressure generally was 1200–1700 p.s.i.g. After gas consumption had ceased or nearly ceased, the autoclave was cooled and vented. The recovered product was analyzed by gas chromatographic techniques. The major products were n-hexyl, 2-methylpentyl and 2-ethylbutyl aldehydes and alcohols. The relative amounts of these materials produced are listed in the Table. A comparison of the rates of reaction for the various catalysts are also given.

It was possible to show by infrared analyses that new complexes were formed by reaction of the nitrogen-containing ligands with dicobalt octacarbonyl.

These novel catalysts were formed as well from cobalt chloride as from dicobalt octacarbonyl.

The accompanying Table is illustrative of the changes in reaction rates available from the use of the substituted pyridine ligands in a cobalt complex hydroformylation catalyst as contrasted with the standard cobalt octacarbonyl Oxo catalyst, as well as such catalyst having a non-substituted pyridine ligand, neither of which catalytically active materials constitutes a part of the present invention but are presented solely for purposes of comparison.

I claim as my invention:

1. In a catalytic hydroformylation process wherein a monoolefinic hydrocarbon is reacted with carbon monoxide and hydrogen in the presence of a cobalt catalyst at a temperature of from about 75 to about 300° C., and a pressure of from about 500 to about 5000 lbs. per square inch, thereby reacting said monoolefinic hydrocarbon with carbon monoxide and hydrogen with the formation of reaction products consisting essentially of saturated aliphated aldehydes and alcohols having one more carbon atom to the molecule than said monoolefinic hydrocarbon, the improvement which consists of using as said cobalt catalyst a complex consisting essentially of cobalt in complex combination with both carbon monoxide and a non-hydrocarbon electro-negative substituted pyridine molecule selected from the group consisting of 2-chloropyridine, 2-bromopyridine, 3-bromopyridine, 3-cyanopyridine and ethyl nicotinate, said complex containing at least one molecule of said non-hydrocarbon electro-negative substituted pyridine for each molecule of cobalt.

2. The process in accordance with claim 1 wherein said complex contains about five moles of said non-hydrocarbon electro-negative substituted pyridine for each atom of cobalt.

3. Catalytic process as in claim 2 wherein the non-hydrocarbon electro-negative substituted pyridine molecule is 2-chloropyridine.

4. Catalytic process as in claim 2 wherein the non-hydrocarbon electro-negative substituted pyridine molecule is 2-bromopyridine.

5. Catalytic process as in claim 2 wherein the non-hydrocarbon electro-negative substituted pyridine molecule is 3-bromopyridine.

6. Catalytic process as in claim 2 wherein the non-hydrocarbon electro-negative substituted pyridine molecule is 3-cyanopyridine.

7. Catalytic process as in claim 2 wherein the non-hydrocarbon electro-negative substituted pyridine molecule is ethyl nicotinate.

*Table*

1-pentene = 0.64 mole
n-octane = 20 ml.
$H_2/CO$ = 2.2
$Co_2(CO)_8$ = 0.001 mole
Nitrogen-containing ligand = 0.010 mole

| Ligand | None (Oxo catalyst) | Pyridine | 2-chloro-pyridine | 2-bromo-pyridine | 3-bromo-pyridine | 3-cyano-pyridine | Ethyl nicotinate | 3,5-dichloro-pyridine | 2,3-pyridine dicarboxylic acid anhydride |
|---|---|---|---|---|---|---|---|---|---|
| Temperature, °C | 100 | 100 | 100 | 100 | 100 | 100 | 100 | 100 | 100 |
| Pressure, max. p.s.i.g | 1,700 | 1,620 | 1,500 | 1,450 | 1,260 | 1,300 | 1,540 | 1,460 | 1,300 |
| Length of Experiment, hrs | 0.30 | 1.4 | 0.5 | 0.5 | 0.5 | 0.5 | 0.5 | 1 | 0.67 |
| Conversion, percent | 76.7 | 85.3 | ~100 | 91.6 | 74.9 | 96.3 | ~100 | 100 | 59.8 |
| Material Balance, percent | 80 | 88 | 96.4 | 103.6 | 87.5 | 84.4 | 89.8 | 94.8 | 106.6 |
| Initial Gas Consumption, mmoles/hr | 276±11 | 116 | 564 | 327 | 902.4 | 459 | 744 | 186 | 323 |
| Initial Rate[a] | 1.69±0.07 | 0.71 | 3.45 | 2.0 | 5.53 | 2.73 | 4.56 | 1,14 | 1.97 |
| Selectivity, percent (no-loss basis) to: | | | | | | | | | |
| Aldehydes | 94.9 | 96 | 98.2 | 97.4 | 98.5 | 96.9 | 97.9 | 96.7 | 95.3 |
| Alcohols | 3.8 | 4 | 1.8 | 2.6 | .15 | 3.1 | 2.1 | 3.3 | 4.7 |
| Product Isomer Distribution, percent (aldehydes plus alcohols): | | | | | | | | | |
| n-Hexyl | 75.6 | 55.6 | 74.6 | 73.2 | 54.1 | 51.7 | 62.6 | 68.9 | 67.6 |
| 2-methylpentyl / 2-ethylbutyl | 24.4 | 44.4 | 25.4 | 26.8 | 45.9 | 48.3 | 37.4 | 31.1 | 32.4 |

[a] Initial rate = $\dfrac{\text{initial gas consumed, mols/hr.}}{(\text{initial olefin conc., mols/l.})(\text{initial cat. conc., mols/l.})}$ References Cited by the Examiner

UNITED STATES PATENTS 2,576,113  11/1951  Hagemeyer _____ 260—604
2,820,059  1/1958  Hasek et al. _____ 260—604
2,834,812  5/1958  Hughes et al. _____ 260—604

LEON ZITVER, *Primary Examiner.*

CHARLES B. PARKER, *Examiner.*